UNITED STATES PATENT OFFICE.

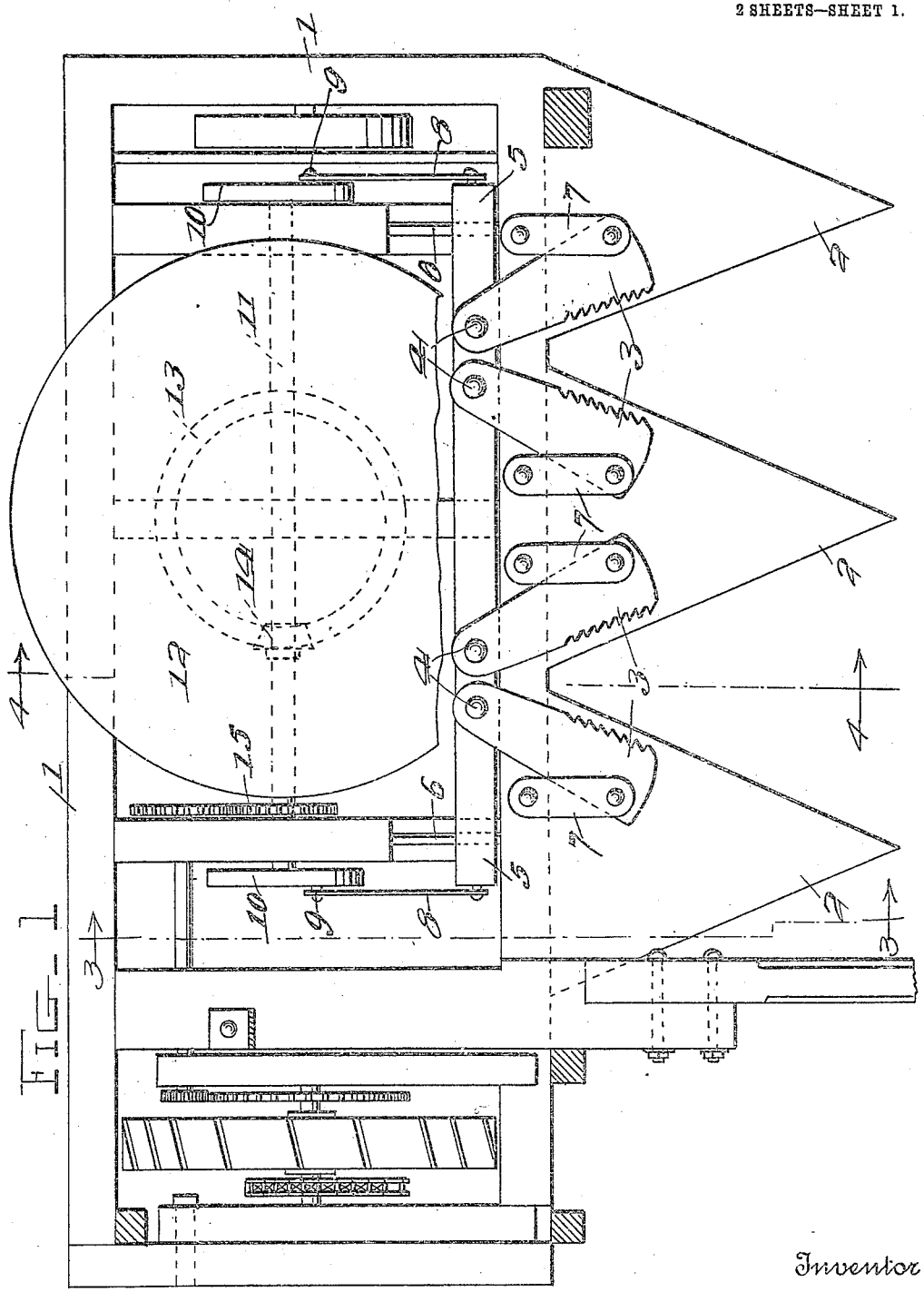

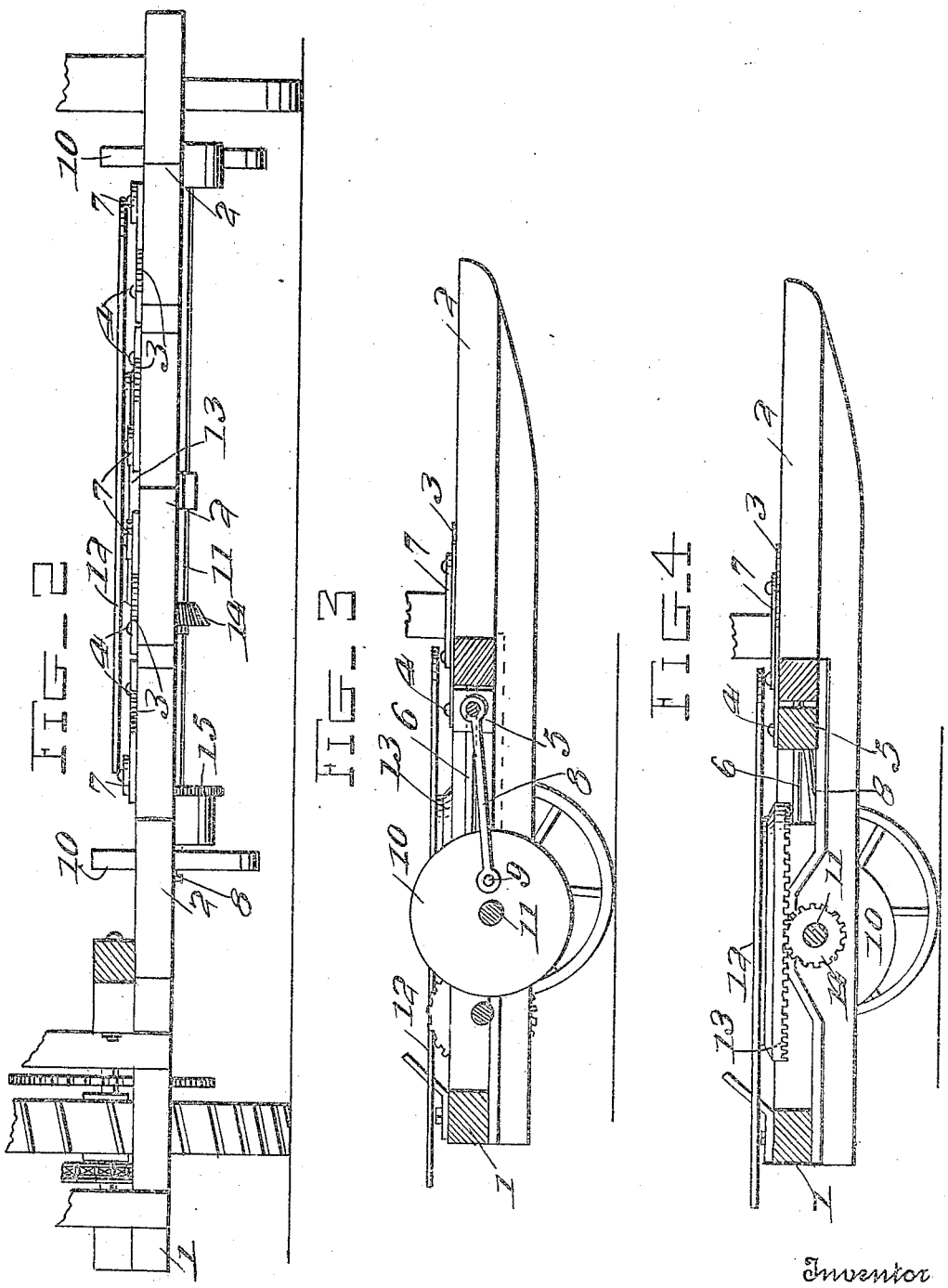

LEWIS E. PARSONS, OF LEWISTOWN, ILLINOIS.

CUTTING MECHANISM FOR CORN-HARVESTERS.

958,165.      Specification of Letters Patent.      Patented May 17, 1910.

Original application filed September 22, 1908, Serial No. 454,183. Divided and this application filed August 2, 1909. Serial No. 510,890.

*To all whom it may concern:*

Be it known that I, LEWIS E. PARSONS, a citizen of the United States, residing at Lewistown, in the county of Fulton and State of Illinois, have invented certain new and useful Improvements in Cutting Mechanism for Corn-Harvesters; and I do declare the following to be a full, clear, and exact description of the invention, such as will enable others skilled in the art to which it appertains to make and use the same.

This invention relates to a cutting mechanism for corn harvesters of that type illustrated in my application for Letters-Patent filed September 22, 1908, Serial No. 454,183, of which the present application is a division.

In the accompanying drawings, Figure 1 is a plan view partly in section, of the cutting mechanism, mounted on a suitable frame; Fig. 2 is a front elevation thereof; Fig. 3 is a transverse section taken on line 3—3 of Fig. 1; and Fig. 4 is a similar view taken on line 4—4 of Fig. 1.

In the embodiment illustrated, the main supporting frame 1 of the machine is provided at its forward edge with a series of approximately triangular-shaped guards 2. Two coöperating pairs of toothed cutting blades or cutters 3, are pivotally mounted to swing toward and from each other over the spaces left between the inner ends of the guards 2, the members of each pair of cutting blades being pivoted near each other as at 4, upon a reciprocating transverse drive bar 5, mounted to slide upon suitable guide rods 6, extending between the guards 2 and the base of the frame. The free end of each cutting blade is connected to the upper face of one of the guards by a link 7. The drive bar 5, is connected at its ends by pitmen 8, with eccentrics 9, carried by suitable fly wheels 10, mounted upon opposite ends of a transverse shaft 11, mounted in turn in the machine frame.

The cut corn is delivered upon a revolving disk platform 12, which is provided with a circular rack 13, which intermeshes with a pinion 14, carried by the shaft 11, which in turn, is driven from the wheel 15, by any suitable form of gearing.

When the machine is in motion, the cutting blades 3, are moved toward and from each other to cut the corn as will be evident from the drawings.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

A cutting mechanism of the class described, comprising a supporting frame provided with a plurality of triangular-shaped guards, a drive bar reciprocatorily mounted in the frame, pairs of toothed cutting knives pivoted on said bar in position for the knives of each pair to swing toward and from each other, pivoted links for connecting the free ends of the knives with the frame, and means for reciprocating the drive bar to actuate the cutting knives.

In testimony whereof I have hereunto set my hand in presence of two subscribing witnesses.

L. E. PARSONS.

Witnesses:
  HARVEY H. ATHERTON,
  W. B. HUGHES.